(12) United States Patent
Cicci et al.

(10) Patent No.: US 7,758,800 B2
(45) Date of Patent: Jul. 20, 2010

(54) SYSTEM AND METHOD FOR RESIN INFUSION

(75) Inventors: Dennis Cicci, Mississauga (CA); Alistair Davie, Carlisle (CA); Michael Singleton, Stoney Creek (CA)

(73) Assignee: Comtek Advanced Structures Limited, Burlington, Ontario (CA)

( * ) Notice: Subject to any disclaimer, the term of this patent is extended or adjusted under 35 U.S.C. 154(b) by 1008 days.

(21) Appl. No.: 11/313,951

(22) Filed: Dec. 22, 2005

(65) Prior Publication Data

US 2007/0145622 A1 Jun. 28, 2007

(51) Int. Cl.
B29C 45/00 (2006.01)
(52) U.S. Cl. ................. 264/511; 264/571; 264/257; 425/145; 425/110
(58) Field of Classification Search ............ 264/511
See application file for complete search history.

(56) References Cited

U.S. PATENT DOCUMENTS

| | | | |
|---|---|---|---|
| 5,045,251 A * | 9/1991 | Johnson .............. | 264/408 |
| 5,210,499 A | 5/1993 | Walsh | |
| 5,439,635 A | 8/1995 | Seemann | |
| 5,464,337 A * | 11/1995 | Bernardon et al. ......... | 425/112 |
| 5,601,852 A | 2/1997 | Seemann | |
| 5,702,663 A | 12/1997 | Seemann | |
| 5,721,034 A | 2/1998 | Seemann, III et al. | |
| 5,863,452 A | 1/1999 | Harshberger, Jr. et al. | |
| 5,885,513 A | 3/1999 | Louderback et al. | |
| 5,958,325 A | 9/1999 | Seemann, III et al. | |
| 6,090,335 A | 7/2000 | McClure et al. | |
| 6,506,325 B1 | 1/2003 | Cartwright | |
| 6,537,483 B1 | 3/2003 | Cartwright et al. | |
| 6,577,958 B1 | 6/2003 | Green et al. | |
| 2002/0155186 A1* | 10/2002 | Walsh .................. | 425/110 |
| 2003/0122285 A1 | 7/2003 | Crane et al. | |
| 2005/0035478 A1 | 2/2005 | Sewell et al. | |
| 2005/0040553 A1* | 2/2005 | Slaughter et al. .......... | 264/40.1 |

OTHER PUBLICATIONS

Abaris Composite Training Newsletter, Issue 3, May 2003, Abaris Training Resources Inc., United States [Retrieved on Sep. 2, 2005] Retrieved from the internet: <URL: http://abaris.com/Downloads/Newsletter3-v3.pdf>.
Abaris Composite Training Newsletter, Issue 6, Jul. 2004, Abaris Training Resources Inc., United States [Retrieved on Sep. 2, 2005] Retrieved from the internet: <URL: http://abaris.com/Downloads/NL6-full.pdf>.

(Continued)

*Primary Examiner*—Eric Hug
*Assistant Examiner*—Jacob Thomas Minskey
(74) *Attorney, Agent, or Firm*—Patrick J. Holbauer

(57) ABSTRACT

Among other things, the present invention provides a system and method for improved infusion of a fiber containing preform with a resin. The system comprises a mould base portion adapted to support the preform and a mould closure portion adapted to overlie the mould base portion in sealable relation to define a mould chamber containing the preform. One or more sensors are attached to the mould base portion and/or to the mould closure portion for monitoring flow characteristics of the resin within the mould chamber. A control means responsive to the sensing means is operatively connected to a resin pump and to a vacuum pump for varying the flow of resin within the mould chamber by varying either or both of the volumetric flow rate of the resin and the level of vacuum within the mould chamber to control infusion of the preform.

32 Claims, 4 Drawing Sheets

OTHER PUBLICATIONS

Advanced Fibre-Reinforced Matrix Products for Direct Processes, Hexcel Corporation, United States [Retrieved on Sep. 8, 2005] Retrieved from the internet: <URL: http://www.hexcel.com/NR/rdonlyres/3208F5FA-E1C3-4172-BF08-D364B89EA3D7/0/AdvancedFibreReinforcedMatrixProductsforDirectProcesses2.pdf>.

Fiber Reinforced Plastics Shop Implements Light RTM to Produce Parts, Case Study of the Minnesota Technical Assistance Program, United States [Retrieved on Sep. 8, 2005] Retrieved from the internet: <URL: http://www.mntap.umn.edu/fiber/41-Phoenix.pdf>.

Infusions Solution, Resoltech Advanced Technology Resins, France [Retrieved on Sep. 8, 2005] Retrieved from the internet: <URL: http://www.resoltech.com/technotes/TNO2UK-INF.pdf>.

(RTM Light) Vacuum Molding Web pages, JHM Technologies Inc., United States [Retrieved on Sep. 8, 2005] Retrieved from the internet: <URL: http://www.rtmcomposites.com/rtm_rtmlight.html>.

Seeman Composite Resin Infusion Molding Process Scrimp Technologies, Joint Service Pollution Prevention Opportunity Handbook; Joint Services, the Defence Logistics Agency and the U.S. Coast Guard, United States [Retrieved on Sep. 8, 2005] Retrieved from the internet: <URL:http://p2library.nfesc.navy.mil/P2_Opportunity_Handbook/2_II_4.html>.

Vacuum Infusion—The Equipment and Process of Resin Infusion, Fibre Glast Developments Corporation, United States [Retrieved on Sep. 8, 2005] Retrieved from the internet: <URL: http://www.fibreglast.com/documents/361.pdf>.

* cited by examiner

SYSTEM AND METHOD FOR RESIN INFUSION

FIELD OF THE INVENTION

The present invention relates generally to the field of resin transfer molding, and more specifically to an improved system and method for infusion of a fiber containing preform with resin.

BACKGROUND OF THE INVENTION

Composite materials exhibit high strength and stiffness as well as corrosion resistant properties. In addition, their light weight is particularly advantageous when compared to similar components constructed from metals. As such, there has been increasing interest in recent years in the use of parts and assemblies constructed from fiber reinforced composite materials in industries such as, for example, the aerospace industry, where parts and assemblies having high strength to weight ratios are desired. Typical textile roving materials used as reinforcement in this regard include, without limitation, woven carbon fiber and Kevlar™ woven fiber.

One of the limiting factors to more widespread use of fiber reinforced composite parts and assemblies in, for example the aerospace industry, has been the relatively high cost of their manufacture, due in part to the fact that their production is time consuming and labor intensive (as compared to, for example, casting or stamping techniques). Moreover, the manufacture of composite parts and assemblies having sectional thicknesses greater than about 1.0 inch in any cross-sectional plane (hereinafter referenced in this specification and claims as "thicker cross-sections") has heretofore been particularly problematic for reasons including those outlined more fully below.

Vacuum assisted resin transfer molding (VARTM) is one common prior art production method for the production of composite parts and assemblies, which method generally involves the use of a mould to enclose one or more fiber containing preforms, a means of imposing a vacuum on the mold, and resin introduced into the mold for infusion through the preform, which infusion is assisted by the draw of the vacuum. Each of the preforms is itself composed of a plurality of woven layers of the textile roving material, which layers are typically pre-adhered to one-another and pre-formed into a desired shape so as to form a core for the particular part or assembly. Generally speaking, the thicker the cross-section of the preform, the greater the number of layers therein for a given textile roving material.

While some success in manufacturing composite parts and assemblies having thicker cross-sections has been achieved through the use of methods and techniques using layers of textile roving material pre-impregnated with a selected resin (commonly and hereinafter referred to as "pre-preg sheets") before being placed into the mould, these methods and techniques present their own set of problems including, without limitation, the very high cost of pre-preg sheets (which are typically obtained from specialized suppliers in pre-impregnated form), the high costs of handling and storing pre-preg sheets (which must typically be shipped and stored in a frozen, or semi-frozen state prior to use), and environmental and workplace safety concerns (depending upon the particular resins used for pre-impregnation, many of which may be toxic). For these and other reasons, composite molding methods and techniques utilizing pre-preg sheets have enjoyed only limited success in the construction of fiber reinforced composite parts and assemblies, and are considered by the co-inventors herein to be non-analogous prior art to the field of the present invention.

It is desirable in the production of composite parts and assemblies of consistently high strength, whether manufactured using a VARTM process, or otherwise, that the preform be substantially uniformly infused with resin during the infusion process, both between the individual textile layers of the preform and between the individual strands of fiber reinforcing material which make up each such layer. Thus, one significant limitation of non-pre-preg prior art infusion processes, including VARTM, is the difficulty of achieving the aforesaid uniform distribution of resin throughout the preform, which is required in order to substantially eliminate air voids and bubbles, and to achieve substantially complete wetting of all areas within the fiber containing preform, thereby improving adhesion of the textile layers to one another during the subsequent curing process, with resultant greater strength, consistency, and quality control for the parts and assemblies so produced. Complete wetting of the fiber containing preform becomes increasingly difficult as the cross-sectional thickness of the preform increases, particularly for the layers of the preform centrally positioned within thicker cross-sectional areas of the preform. Moreover, the time required for resin infusion of parts and assemblies increases in a non-linear fashion with cross-sectional thickness of the preform.

One prior art technique used with VARTM processes to improve resin infusion includes the use of distribution media positioned between the mould and the preform to facilitate the speed and degree of resin infiltration through the preform. However, this technique typically adds additional steps (both before and after resin infusion) and additional material to the manufacturing process and, as such, significantly increases the costs of production.

Another problem related to that of complete wetting of the preform arises from the fact that resin introduced into the mould that does not penetrate into the fibers of the preform tends to accumulate around the outer surfaces of the preform, where it does little to improve the strength of the composite part or assembly, yet adds to its weight. This phenomenon is generally referred to in the art as "race-tracking." Thicknesses of parts or assemblies can exceed tolerable levels as a result of too much resin accumulating in regions of the preform and effectively forcing the individual plies apart. This can be problematic in many applications, especially in industries where thickness tolerances are much tighter, such as, for example, the aerospace industry. These quality control issues can result in the discarding of expensive sub-standard parts and assemblies.

Thus, for the reasons mentioned above, amongst others, it has not been practical or economical using known prior art systems or techniques to produce fiber reinforced composite parts and assemblies having thicker cross-sections and/or large thickness variations within the parts themselves. There thus exists in the prior art, amongst other things, a need to address these and other limitations, which need is increasing over time as, for example, the aerospace industry looks to increase the variety, complexity and size of composite parts and assemblies used in the construction of airplanes and spacecraft to, amongst other things, reduce weight and fuel consumption.

BRIEF SUMMARY OF THE INVENTION

Amongst other things, the present invention in some embodiments allows for the resin infusion of a preform positioned in a mould to be controlled in a novel and unobvious manner by using sensed data manipulated by a control system to vary the effects of pumps connected to both the resin inlet(s) and outlet(s), thereby to accurately control any one, or all, of the speed, direction and volume of resin infused into the preform. In this manner, the present invention provides, inter alia, for quicker and more complete infusion of fiber containing preforms by closely monitoring and controlling the resin infusion process in real time, or near real time. This, in turn, results in, amongst other things, the possibility of producing, in a given time period, a greater number of high quality composite parts and assemblies at lower cost. These benefits are particularly advantageous for composite parts and assemblies having thicker cross-sections.

Accordingly, amongst other things, the present invention provides systems and methods for infusing a fiber containing preform with a resin. The systems of the present invention may include a mould base portion overlain by a mould closure portion in sealable relation therewith. The mould base portion and overlain mould closure portion define a mould chamber, with the preform being within the mould chamber and possibly supported by the mould base portion. The systems of the present invention may further include one or more resin supply port means in fluid communication with the mould chamber for guiding resin. The systems of the present invention may further include one or more resin pumps in fluid communication with the resin port means to supply the resin at a variable volumetric rate. The systems of the present invention may further include a variable vacuum means adapted to create and vary a vacuum. The systems of the present invention may also include one or more vacuum port means in fluid communication with the mould chamber and the variable vacuum means and adapted to impose a vacuum upon the mould chamber. The systems of the present invention may further include one or more sensing means which may be attached to one or more of the mould base portion and the mould closure portion for monitoring one or more flow characteristics of the resin within the mould chamber. The systems of the present invention may further include a control means responsive to the sensing means and operatively connected to the resin pumps and to the variable vacuum means for varying the flow of the resin within the mould chamber by varying one or more of the variable volumetric rate and the vacuum to effect infusion of the preform.

In some cases of the systems of the present invention, the control means may be a digital processor.

The methods of the present invention may include predetermining target ranges of resin flow characteristics. The methods of the present invention may also include supporting said preform on a mould base and may further include overlying the mould base with a mould closure in sealable relation so as to define a mould chamber, with the preform contained within. The methods of the present invention may further include imposing a vacuum upon the mould chamber. The methods of the present invention may further include injecting resin into the mould chamber at a variable volumetric rate. The methods of the present invention may further include electronically monitoring one or more flow characteristics of the resin within the mould chamber. The methods of the present invention may further include varying, in response to the monitored flow characteristics, and in real time or near real time, the variable volumetric rate at which resin is injected.

In some cases of the methods of the present invention, the vacuum may be varied in response to the monitored flow characteristics, and this variation may occur in real time, or near real time. In various cases of the method of the present invention, both the variable volumetric rate and the vacuum may be varied in response to the monitored flow characteristics, and in real or near real time.

In some cases, the methods of the present invention may further include drawing excess resin out of the mould chamber through the resin supply port means.

This summary provides only a general outline of some embodiments according to the present invention. Many other objects, features, advantages, and other embodiments of the present invention will become more fully apparent from the following detailed description and the appended claims with reference to the accompanying drawings, the latter of which is briefly described hereinbelow.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which but a single embodiment of the system and method of the present invention are illustrated by way of example, only. It is expressly understood, however, that the drawings are for the purpose of illustration and description only, and are not intended as a definition of the limits of the invention. In the accompanying drawings.

DETAILED DESCRIPTION OF THE INVENTION

Figure 1:
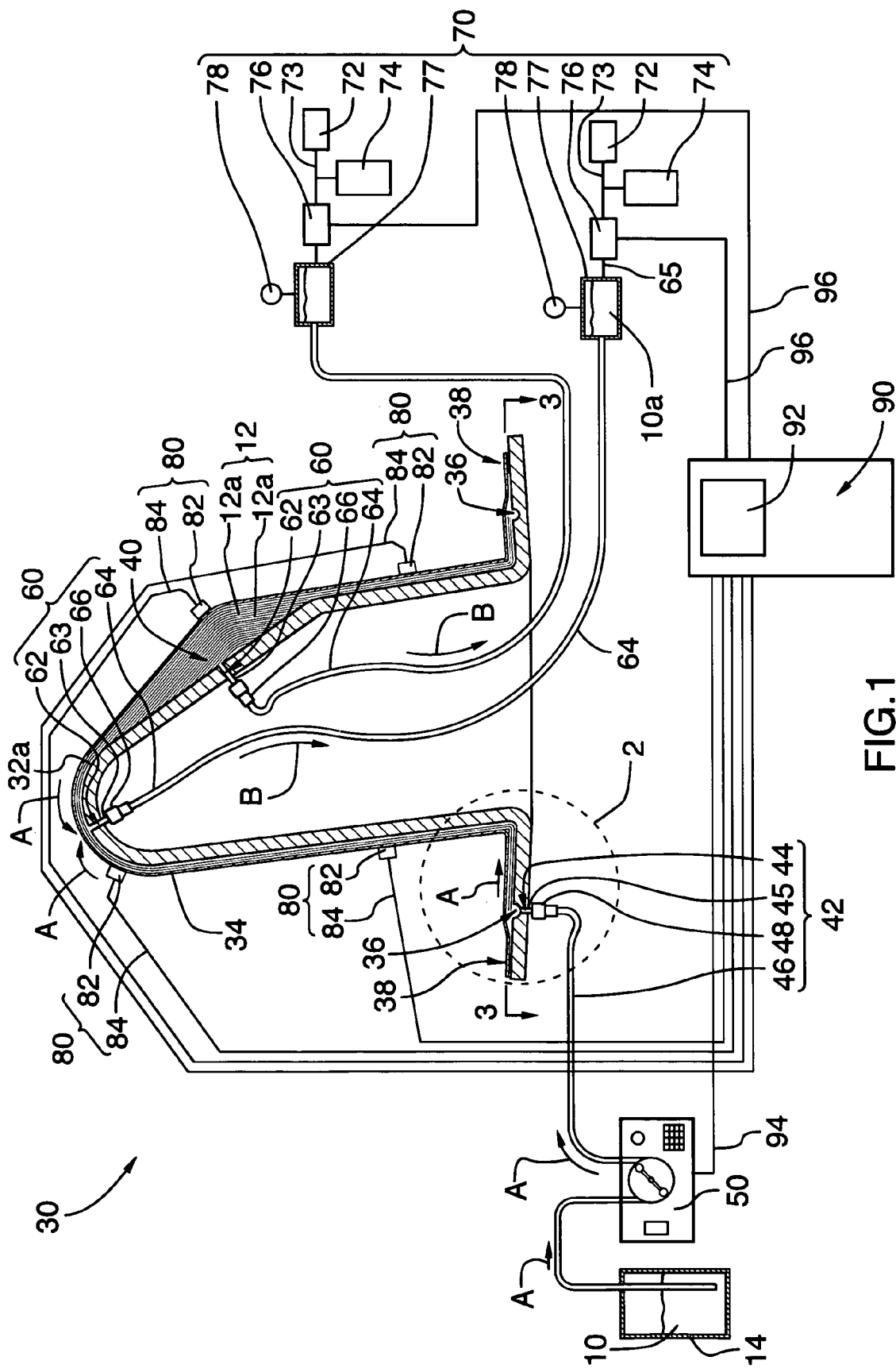
FIG. 1 is a diagrammatic view, partly in section, of a system within the scope of the present invention.
Figure 2:
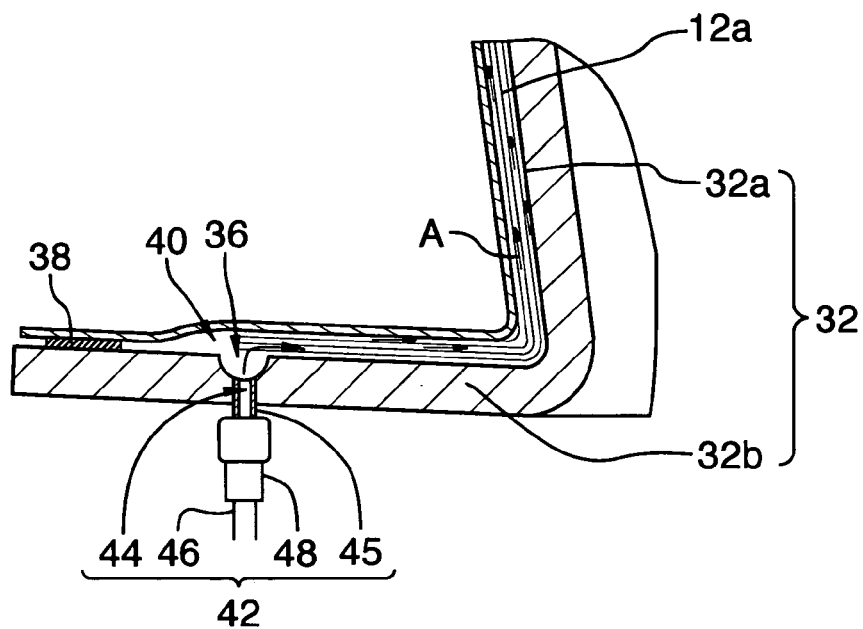
FIG. 2 is an enlarged side view of the encircled area 2 of FIG. 1.

Referring now to FIG. 1 of the drawings, there will be seen a system 30 for infusion of a fiber containing preform 12 with a resin 10 in accordance with but one non-limiting embodiment of the present invention. For ease of illustration, the preform 12, best shown in FIG. 1, is of a relatively simple shape, but preforms 12 of much more complex shapes and cross-sections may be infused with resin 10 in accordance with analogous embodiments of the present invention, so as to achieve similarly beneficial results. The list of resins that can be used with the present system 30 includes, but is not limited to, epoxy, cyanate ester, polyester and phenolic resins. Prior to commencement of infusion, the resin 10 will be contained in a prior art resin pot 14 which may be, but is not necessarily, a tub or other suitable container sealed to the outside air. The system 30 includes a mould base portion 32 adapted to support at least a portion of the preform 12 in overlying relation. The mould base portion 32 may be constructed of wood, steel or plastic materials, but is preferably constructed from a composite material having a low coefficient of thermal expansion, and may advantageously be substantially formed, as shown, to correspond in shape to substantially the entire overlying portion of the preform 12. Each preform 12 is composed of a plurality of woven layers 12a of a fiber containing textile roving material, which layers 12a are typically pre-adhered to one another and pre-formed into a desired shape, as known in the art, so as to form a core for the particular composite part or assembly being manufactured. As well known in the art, the fibers which make up the layers 12a may be chosen from a group comprising, but not limited to, Kevlar™ woven fiber, Kevlar™ unidirectional fiber, woven glass fiber, unidirectional glass fiber, woven carbon fiber and unidirectional carbon fiber. As best seen in FIG. 2, the mould base portion 32 typically includes a central body portion 32a and a peripheral flange portion 32b.

The system also includes a mould closure portion 34 adapted to overlie the mould base portion 32, in sealable relation therewith, so as to define a mould chamber 40. In a similar manner to the mould base portion 32, the mould closure portion 34 may also be constructed of wood, steel, plastic or composite materials; particularly where resin injection is to be carried out under higher resin pressures above, for example, about 28 inches Hg; however, and as is the case with the lower pressure VARTM process embodiment shown in FIG. 1, the mould closure portion 34 may be a known form of vacuum bag 34, which vacuum bag 34 may be composed of such commercially available materials as nylon, polypropylene, silicon rubber, and the like. Furthermore, the vacuum bag 34 may also need to be composed of a material capable of withstanding higher temperatures, depending on the type of resin 10 being used, and on whether or not the vacuum bag 34 is to be heated during any subsequent curing process. The selection of the material to be used for construction of the mould closure portion 34 is, in any event, outside the scope of the present invention, and a matter of routine choice to be made by those skilled in the art.

As best shown in FIG. 2, a seal 38 joins the vacuum bag 34 and the mould base portion 32 in sealed relation to one another. For ease of illustration, the seal 38 shown is of generally rectangular plan outline (with rounded corners), and is located on the peripheral flange portion; however, it could be located at different positions between the mould base portion 32 and the vacuum bag 34, depending upon the shape of the particular preform 12 and the materials used to construct the mould base portion 32 and mould closure portion 34. Again, routine design choice plays a role in the shape and position of the seal 38 as between particular workpiece applications. The seal 38 may be constructed from an adhesive material, a rubber material, a liquid material, a putty, or, as shown, a semi-liquid sealant such as, but not limited to, epoxy and the like. The seal 38 is preferably releasable and resealable, but need not be so. One skilled in the art will recognize that the seal 38 may be any seal means, including self-adhesive gasketing material, capable of maintaining a sealed bond between the mould base portion 32 and the mould closure portion 34 while an operative vacuum, which is variable and generally within the range of about 5 inches Hg to 28 inches Hg, is drawn on the mould chamber 40. The seal 38 may also be a mechanical device such as, for example, a gasket with suitable clamps depending upon, again, the materials used to construct the mould base portion 32 and mould closure portion 34, as well as the resin pressure level used with any particular embodiment.

Figure 3:
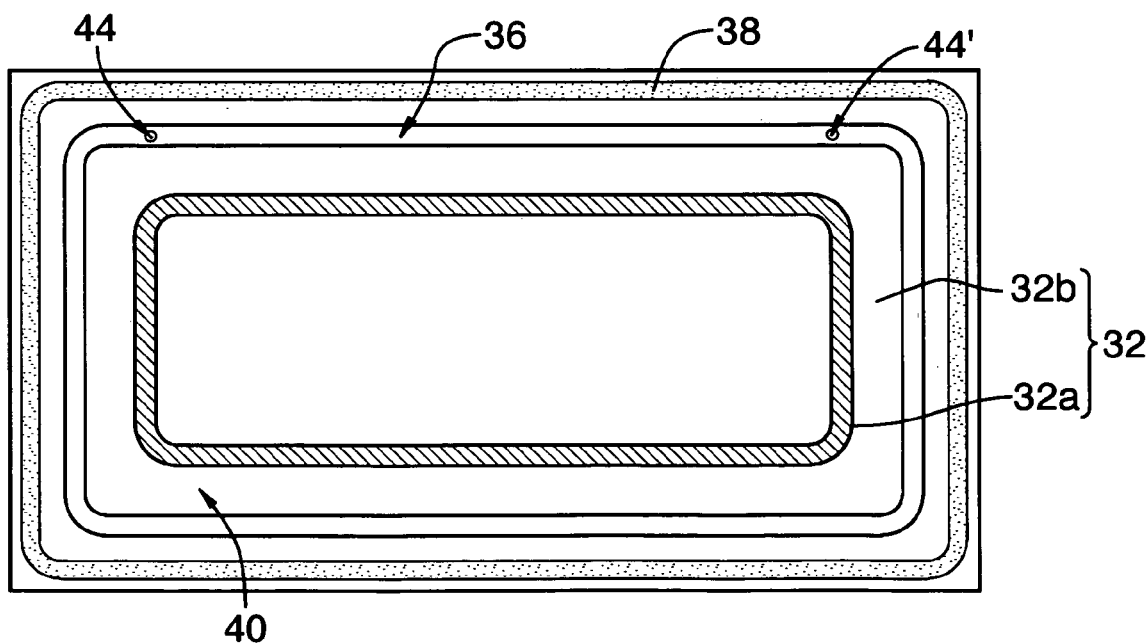
FIG. 3 is a sectional view along sight line 3-3 of FIG. 1.

As best seen in FIGS. 2 and 3, a resin channel 36 is preferably, but optionally, included in the form of a concave depression on the upper surface of the peripheral flange portion 32b, inside of the seal 38. As seen in FIG. 3, the resin channel 36 is shown to be in the continuous plan shape of a rectangle having rounded corners; however, one skilled in the art will recognize that the resin channel 36 may be of any suitable geometry so as to assist the resin 10 to flow more quickly and evenly around the preform 12. Such geometries are not limited to, channels that are rectangular, triangular, circular, linear and square in plan outline. The exact shape and position of the resin channels 36 to be used in any particular application or embodiment is a matter of routine design choice to be made by one skilled in the art, which choice may optionally be assisted by computer modelling (as described more fully below).

One or more vacuum port means 60 are provided so as to be in fluid communication with the mould chamber 40 and a variable vacuum means 70. Each vacuum port means 60 preferably, but optionally, comprises a vacuum port 62, a vacuum port nipple 63, a releasable vacuum line coupling 66 and one or more primary vacuum lines 64. As best seen in FIG. 1, each vacuum port 62 is an opening in the mould base portion 32 through which a vacuum can be drawn on the mould chamber 40. As best seen in FIG. 1, each vacuum port nipple 63 is in axial registry with and in fluid communication with a respective vacuum port 62 and each extends outwardly from its respective vacuum port 60, away from the mould chamber 40. The releasable vacuum line couplings 66 are releasably connectable, as is well known in the art, to each of the vacuum port nipples 63 and the primary vacuum lines 64 as shown. The vacuum port nipples 63 may be advantageously be composed of steel. The vacuum port nipples 63 may alternatively be composed of, without limitation, brass, aluminum, plastic or composite materials. One skilled in the art would recognize that the vacuum port nipples 63 may be composed of any substantially rigid material that can be adhered or otherwise operatively affixed to the mould base portion 32 or mould closure portion 34 and operatively connected with the releasable vacuum line coupling 66. As well known in the art, each releasable vacuum line coupling 66 may advantageously be constructed from steel or, without limitation, brass, aluminum, or plastic. As best shown in FIG. 1, the primary vacuum lines 64 connect the releasable vacuum line couplings 66 to the variable vacuum means 70. The primary vacuum lines 64 may advantageously be constructed from, for example and without limitation, flexible rubber or PVC tubing, which may or may not be steel reinforced, depending upon the particular application and vacuum pressures used. The primary vacuum lines 64 may be composed of other flexible hose or tubing materials, so long as they are capable of maintaining structural integrity under the intended operative vacuum pressure.

Figure 4:
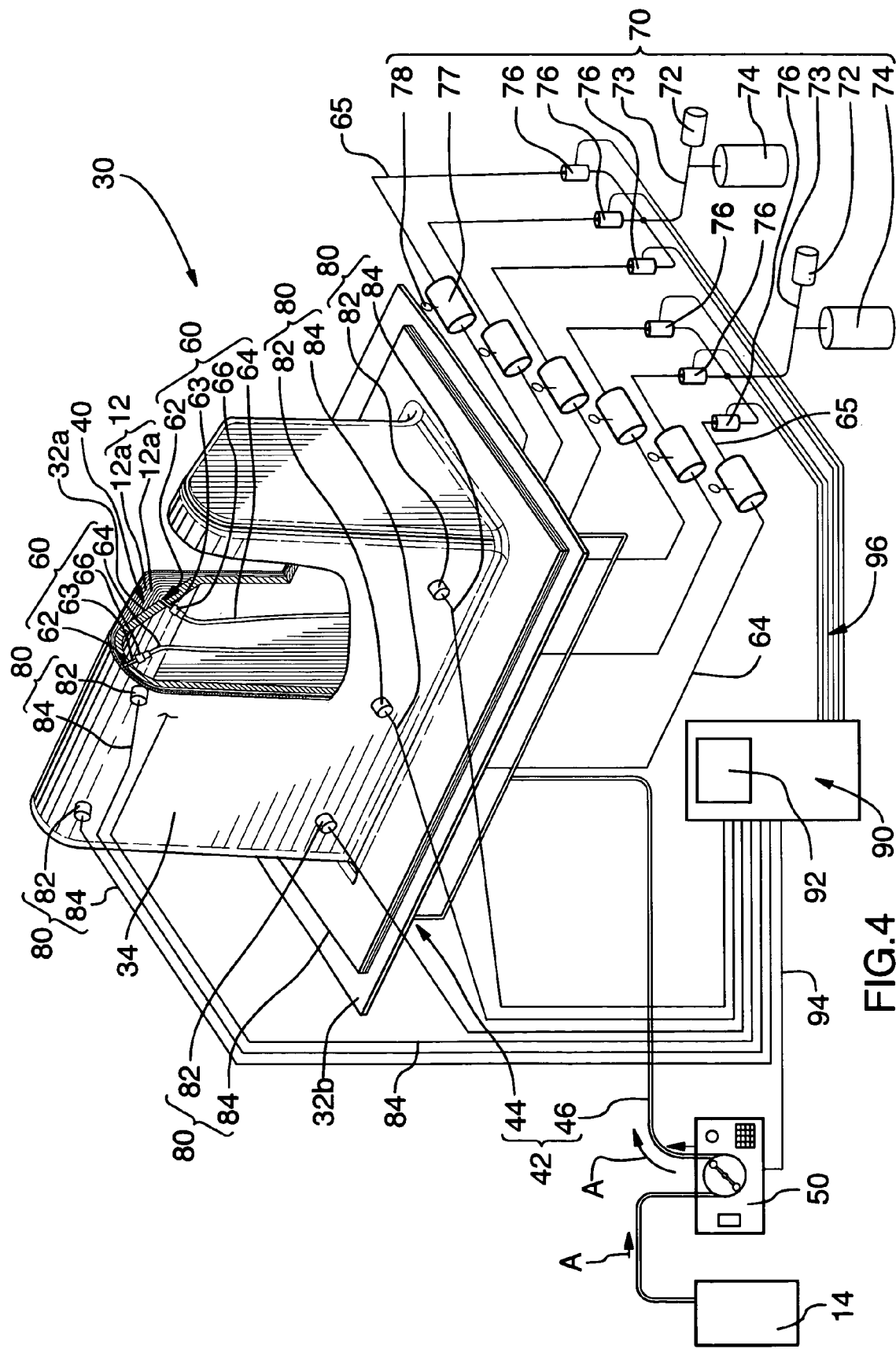
FIG. 4 is a perspective view of the system of FIG. 1, with a section cut away for ease of illustration.

For ease of illustration, but two vacuum ports 62 are shown in FIGS. 1 and 4. The number and placement of vacuum ports 62 can and will vary significantly with different sizes and shapes of the preform 12. Also for ease of illustration, the vacuum ports 62 are shown as only located in the mould base portion 32; however, vacuum ports 62 may be located in the mould base portion 34, or in the mould closure portion 32, or in both portions 32, 34, again depending on the particular application and workpiece to be infused. Thus, the number and location of the vacuum ports 62 is a matter of routine choice to be made by one skilled in the art, which choice may be assisted by computer simulation using commercially available modelling software, available for this purpose, such as, for example, RTM-Worx™ (available from Polyworx, Ammerstol, The Netherlands).

As described hereinabove, the variable vacuum means 70 is, though the agency of the vacuum port means 60, in fluid communication with the mould chamber 40. The variable vacuum means 70 comprises one or more vacuum pumps 72 and one or more vacuum regulators 76. Each vacuum pump 72 should be sized and otherwise capable of applying a sufficient draw on the vacuum port means 60 to thereby impose an operative vacuum on the mould chamber 40. As best seen in FIG. 4, each vacuum pump 72 may advantageously be connected, by suitable tertiary vacuum lines 73 to multiple vacuum regulators 76. Rotary Vane High Vacuum pump Model No. 4396K21 (available from McMaster-Carr® Supply Company, of Elmhurst, Ill., U.S.A.) is one example of a suitable vacuum pump 72 which may be used to practice the present invention, but the invention is not limited to the use of this particular brand or type of vacuum pump 72. The tertiary vacuum lines 73 may advantageously be constructed from, for example and without limitation, flexible rubber or PVC tubing, which may or may not be steel reinforced, depending upon the particular application and vacuum pressures used. The tertiary vacuum lines 73 may be composed of other flexible hose or tubing materials, so long as they are capable of maintaining structural integrity under the intended operative vacuum pressure.

For ease of illustration, but two vacuum pumps 72 are shown in FIG. 4. The number of vacuum pumps 72 employed in different embodiments of the present invention can and will be different. The number of vacuum pumps 72 employed in a particular embodiment of the present invention is a matter of routine design choice and could be any number of one or greater. The precise number of vacuum pumps 72 to be used and their precise manner of interconnection to the vacuum ports 62 will depend on factors including, but not limited to, the number of vacuum ports 62 and the size and composition of the particular preform 12 and mould chamber 40. In a similar manner, the determination of the number of vacuum ports 62, the determination of the number of vacuum pumps 72 and other details of their connection to the vacuum ports 62, may be assisted by computer simulation of the infusion process, using modelling software such as the aforementioned RTM-Worx™.

The vacuum regulators 76, as seen in FIGS. 1 and 4, may advantageously be valves with electronically controllable variable apertures. As best shown in FIG. 4, there may be multiple vacuum regulators 76 connected to each of multiple vacuum pumps 72, with each vacuum regulator 76 being associated with and connected to a respective vacuum port means 60.

The variable vacuum 70 means may further advantageously comprise one or more vacuum reservoirs 74, which, as best shown in FIG. 4, may be interconnected by the tertiary vacuum lines 73 between each vacuum pump 72 and one or more vacuum regulators 76. These vacuum reservoirs 74 may advantageously be conventional vacuum tanks constructed from steel, or the like, and are provided and plumbed according to good design practice to facilitate the maintenance of an operative vacuum of substantially constant level, on the vacuum source side of each vacuum regulator 76 and vacuum port 62 by means of the primary vacuum line 64, connected as aforesaid to the vacuum port nipple 63. The Vacuum Reservoir Compression Tank (manufactured by and commercially available from Anver Corp., of Hudson Mass., U.S.A.) is one suitable vacuum reservoir 74, but the present invention is not limited to the use of this or any other particular type of vacuum reservoir 74.

The vacuum port means 60 further comprises one or more resin overflow tanks 77, which may, as seen in FIGS. 1 and 4, be operatively connected to each vacuum regulator 76, by a respective secondary vacuum line 65, and to each respective vacuum port means 60. The secondary vacuum lines 65 may advantageously be constructed from, for example and without limitation, flexible rubber or PVC tubing, which may or may not be steel reinforced, depending upon the particular application and vacuum pressures used. The secondary vacuum lines 65 may be composed of other flexible hose or tubing materials, so long as they are capable of maintaining structural integrity under the intended operative vacuum pressure. The resin overflow tanks 77 are sealed such that their inclusion has substantially no effect on the vacuum level. The resin overflow tanks 77 are of conventional design, and may advantageously be composed of steel or any other substantially rigid material. They may additionally be optionally fitted with a conventional vacuum gauge 78 to provide an operator (not shown) with a visual indication of the instantaneous vacuum being drawn on any particular one of the primary vacuum lines 64.

One or more resin supply port means 42 are provided in fluid communication with the mould chamber 40. Each resin supply port means 42 comprises an inlet port 44, an inlet port nipple 45, a releasable resin supply line coupling 48 and a resin supply line 46. As best seen in FIG. 1, each inlet port 44 is comprised of an opening in the peripheral flange portion 32b of the mould base portion 32 through which the resin 10 can be injected into the resin channel 36 and the mould chamber 40. As best seen in FIG. 1, the inlet port nipple 45 is in axial registry with and in fluid communication with a respective inlet port 44, positioned thereabove, and each extends outwardly from the inlet port 44, away from the mould chamber 40. As best seen in FIG. 2, the releasable resin supply line coupling 48 is, as well known in the art, operatively connected to a respective inlet port nipple 45 and to a respective resin supply line 46. As is also well known in the art, each releasable resin supply line coupling 66 may advantageously be constructed from steel, or, without limitation, from brass, aluminum or composite materials. The inlet port nipple 45 may advantageously be constructed from steel, or from any substantially rigid material of any suitable shape, as to allow for operative connection to the releasable resin supply line coupling 48, and so as to allow for injection of resin 10 into the mould chamber 40. Such materials include, but are not limited to, aluminum, brass, plastic and composite materials. As best seen in FIG. 1, the resin supply line 46 connects the releasable resin supply line coupling 48 to a resin pump 50. The resin supply line 46 may preferably be constructed from a flexible nylon tubing which may, or may not, be resistant to high temperatures, depending on the type of resin 10 being injected. One skilled in the art will recognize that the resin supply lines 46 may be constructed from any flexible material that is sealed from the outside air and does not break down when in contact with the particular resin 10 being injected. The group of suitable materials includes, but is not limited to, silicon rubber and PVC.

For ease of illustration, but one inlet port 44 is shown in FIG. 1, located in the peripheral flange portion 32b of the mould base portion 32. From FIG. 3, it will be noted that two inlet ports 44 and 44' are actually present in the exemplary embodiment of the present invention shown in FIGS. 1 through 4. A respective resin pump 50 (not shown) would also be connected by a respective resin supply line 46 (not shown) to the second inlet port 44 in an analogous manner to the inlet port 44. These have been omitted for ease of illustration. The number of inlet ports 44, 44' is a matter of routine choice to be made by one skilled in the art and may vary significantly from one installation to another, dependent on factors such as the size, shape and geometry of the preform 12, as previously discussed. Moreover, the number and placement of the inlet ports 44, 44' may be optimized in any particular installation with the assistance of computer simulation, similar to that discussed with respect to vacuum port 62 numbers and locations, again using modelling software, such as the aforementioned RTM-Worx™.

One or more resin pumps 50 are provided in fluid communication with the one or more resin supply port means 42 and are adapted to draw the resin 10 from the resin pot 14 and to inject the resin 10 under positive pressure into the mould chamber 40. Each resin pump 50 should be capable of supplying resin 10 to the inlet ports 44, 44' at a variable volumetric rate. In this specification and the appended claims, the term "variable volumetric rate" means a rate, wherein a target volume of resin is displaced through the subject resin pump 50 per unit time, thereby providing the ability to closely vary the volume of resin 10 supplied to the mould chamber 40 as per unit time. By way of comparison, injection of resin 10 at a variable volumetric rate contrasts with the prior art practice of allowing only the vacuum draw or the vacuum draw coupled with gravity to dictate the amount of resin 10 entering the mould chamber 40. Moreover, where resin pumps have been used in the prior art, their operation has typically not been controlled with reference to resin volume per unit time. Rather, it has been controlled by instantaneous pressure, typically triggering an on/off control response to the pump. That is, injection of resin 10 at a variable volumetric rate is also different from prior art methods and apparatuses which specify a set resin pump 50 pressure at the inlet port 44 (or elsewhere within the mould chamber 40). In the present invention, the volume of resin 10 entering the mould chamber 40 (which is critical to product quality) can be closely controlled and varied. As such, an additional parameter over which control can be exercised in an infusion process is thereby provided by injecting resin at a variable volumetric rate.

The resin pumps 50 used in embodiments of the present invention should, but need not, be reversible so as to not only be adapted to inject resin 10 into the mould chamber 40, but also to withdraw resin 10 from the mould chamber 40 via the inlet ports 44 as necessary in real or near real time in any particular application. The reversibility of the resin pump 50 also enables the system 30 to lower the resin pressure within the mould chamber 40 as necessary, to thereby prevent over-injection errors in the infusion process. Such errors could result in a high weight to strength ratio for the composite part or assembly (as previously mentioned), bulging of the vacuum bag due to excess resin and excess vacuum draw, as well as the forcing apart of layers 12a (possibly resulting in a thickness outside of tolerances) due to resin build up within areas of the preform 12. As best seen in FIG. 1 and FIG. 4, each resin pump 50 may advantageously be a peristaltic pump 50, such as the Series 913 Mity-Flex Peristaltic Pump (manufactured by Anko Products, Inc., of Bradenton, Fla., U.S.A.). Peristaltic pumps 50, such as that shown, employ a continuous and sealed resin supply line 46. Peristaltic pumps 50 effectively displace resin 10 by squeezing the resin supply line 46 which runs from the resin pot 14, through the peristaltic pump 50, and on to the inlet port 44. As such, there is little to no risk of contamination of the resin 10 in the resin supply line 46 or by the resin pump 50. This is of particular significance in the aerospace industry. Production standards are so high that contamination of the resin could cause sufficient structural deficiencies as to render the particular composite part or assembly useless in the field. Moreover, the parts of the peristaltic pump 50 do not come into actual physical contact with the resin, with the result that pump cleaning and maintenance is significantly lessened over prior art pumps which make intimate physical contact with the resin 10. Moreover, pump replacement is greatly facilitated, without the need for pump disconnection or disassembly.

For ease of illustration, but one resin pump 50 is shown in FIG. 4; however, the number of resin pumps 50 may be substantially and routinely varied according to different operational requirements and parameters. The actual number of resin pumps 50 is a matter of design choice for one skilled in the art, which choice may be assisted by computer simulation, similar to that described with respect to numbers and locations of inlet ports 44, again using modelling software, such as the aforementioned RTM-Worx™.

One or more sensing means 80 are further included as part of the present invention, and each includes sensors 82 and one or more sensor lines 84. The sensor lines electronically connect each sensor 82 to a control means 90. The sensors 82 may advantageously be ultrasonic based transducers. The sensors 82 may also be, but are not limited to, resistance, capacitance, electrically and dielectrically based sensors. The sensor lines 84 may advantageously be insulated copper wires. The sensor lines may also be composed of any material capable of acting as a conduit for transmission of one or more electronic signals. While shown in FIGS. 1 and 4 as each individually connecting to the control means 90, in some embodiments of the present invention the sensor lines 84 may be multiplexed.

For ease of illustration, but six sensors 82 are shown or suggested in FIG. 4, and another six are suggested in FIG. 1 (i.e. 2 rows of 3 each), and those shown or suggested are shown as only attached to the vacuum bag 34; however, the number of sensors 82 can and will vary significantly in different applications of the present invention. Sensors 82 may be positioned on the mould closure portion 34 (as shown), the mould base portion 32 (not shown), or both portions 32, 34 (not shown). The actual number and placement of the sensors 82 is a matter of routine design choice for one skilled in the art, which choice may advantageously be assisted by computer simulation, again using modelling software such as the aforementioned RTM-Worx™.

The control means 90 is responsive to the one or more sensing means 80 and operatively connected, as shown in FIGS. 1 and 4, to the resin pumps 50 and the variable vacuum means 70. The control means 90 preferably comprises a digital processor 92. The digital processor 92 may be any digital processor programmed and otherwise capable of rapidly manipulating large quantities of data and performing large numbers of calculations and analyses. Such manipulations, calculations and analyses include, but are not limited to, comparisons of signals received in digital form, with stored sets of data. The digital processor 92 is also capable of generating and transmitting signals based on the manipulations, calculations and analyses described above. In this regard, the digital processor 92 is in control signal conveying relation with the resin pumps 50 and the variable vacuum means 70. As shown in FIG. 1 and FIG. 4, resin control lines 94 and vacuum control lines 96 electronically connect the control means 90 to the resin pump 50 and the variable vacuum means 70, respectively. Both the resin control lines 94 and vacuum control lines 96 may advantageously be insulated copper wires. The resin control lines 94 and vacuum control lines 96 may be composed of any material capable of acting as a conduit for transmission of one or more electronic signals. While shown as individually connecting to the control means 90, in some embodiments of the present invention the resin control lines 94 may be multiplexed, as may also be the case with the vacuum control lines 96.

In use, reference signals representative of target ranges of flow characteristics are externally predetermined and input to the digital processor 92 prior to commencement of infusion. This predetermination may be assisted by computer simulation of the infusion process, using modelling software such as the aforementioned RTM-Worx™. The reference signals will be predetermined for various locations throughout the mould chamber 40 substantially corresponding to the locations of the sensors 82, and at substantially all times for such locations from the beginning to the end of the infusion process. The flow characteristics include resin pressure, resin temperature and resin position within the mould chamber 40, but may also include other properties relevant to characterizing behaviour of the resin 10 within the mould chamber 40. More specifically, resin position within the mould chamber 40 refers to the presence or absence of the resin 10 at locations throughout the layers 12a of the preform 12. Additionally, resin position within the mould chamber 40 refers to the speed and direction of the movement of the resin 10 at any points where resin 10 is present. The system 30 of the present invention may be employed to infuse thick and complex preforms 12. As such, the reference signals may be indicative of the flow characteristics in three dimensional terms. Further, the reference signals are generated specifically for the particular arrangements and numbers of inlet ports 44, 44', resin pumps 50, vacuum ports 62, vacuum pumps 72 and sensors 82 being employed in the infusion of the particular preform 12. Additionally, the reference signals are also specific to particular initial values of the variable volumetric rate and vacuum draw on the mould chamber 40.

In use, a vacuum is imposed on the mould chamber 40 through the vacuum port means 60 as a result of the draw of the vacuum pumps 72, which is in a vacuum draw direction (as generally indicated by reference arrows "B" in FIG. 1). The initial level of vacuum draw is a matter of routine choice for one skilled in the art which may be assisted by the use of computer simulation, using modelling software such as the aforementioned RTM-Worx™. The vacuum draw level will be substantially maintained by the vacuum reservoirs 74. The vacuum draw at various locations in the mould chamber 40 may be varied via the vacuum regulators 76. Adjustments can be made to the vacuum draw on the mould chamber 40 at one or more of the vacuum ports 62, through the use of the vacuum regulators 76, thereby allow differing variation in draw at different specific locations. These adjustments may be accomplished by narrowing or widening, depending on whether the draw is to be lowered or increased at the particular vacuum port 62, the variable apertures of the valves of the particular vacuum regulators 76. Thus, the vacuum draw at individual vacuum ports 62 may be varied independently of the vacuum draw at all other vacuum ports 62. Similarly, the vacuum draw at groups of vacuum ports 62 may be varied uniformly, as may the draw at all vacuum ports 62 together. The vacuum level in the mould chamber 40 may be also varied by altering the speed of, or shutting down of, the vacuum pumps 72 as well as by draining the vacuum reservoirs 74, if any vacuum reservoirs 74 are in use in the particular embodiment. One skilled in the art will recognize that such variation may more advantageously be accomplished using the vacuum regulators 76, as described hereinabove. Vacuum regulator 76 adjustments and vacuum pump 72 speed alterations, or shutdowns, can each occur on their own, in pairs, or could all occur simultaneously.

In use, resin infusion is begun by injecting resin 10 (by activation of the resin pump 50) into the mould chamber 40 through the resin supply port means 42. Resin 10 enters the mould chamber 40 through the inlet ports 44 and 44' in a resin flow direction (as generally indicated by reference arrows "A", best seen in FIGS. 1 and 2). The resin pumps 50 supply resin 10 to the inlet ports 44 and 44' at the aforementioned variable volumetric rate. The initial magnitude of the variable volumetric rate is a matter of routine choice by one skilled in the art, which choice may be assisted by computer simulation, using the aforementioned RTM-Worx™ modelling software. In order to be suitably viscous for infusion into fiber containing preforms 12, resin viscosity will generally be in the range of about 100-250 centipoise. As such, the resin 10 may be heated prior to infusion, depending on the characteristics of the particular resin 10 with respect to viscosity as a function of temperature. For example, a cyanate ester resin would need to be heated to approximately 200-250° F. in order to facilitate injection and subsequent wetting of the layers 12a of the preform 12. As shown, the resin 10 will exit the inlet port 44 into the resin channel 36. The resin 10 will flow around the resin channel 36 and will be drawn into the preform 12 (in the vacuum draw direction). The resin 10 may completely fill the resin channel 36 prior to being drawn into the any regions of the preform 12, but need not do so. One skilled in the art will recognize that some embodiments of the present invention may not include resin channels 36. In such embodiments, the resin 10 will exit the inlet ports 44 and be drawn directly into the layers 12a of the preform 12. Such configurations may be advantageous with relation to infusing resin 10 into preforms 12 with more complex geometries and greater variations in thickness between regions of the particular preform 12 than the preforms 12 shown in FIGS. 1 and 4.

The sensors 82 are employed to monitor the flow characteristics of the resin 10 within the mould chamber 40. More specifically, as the present invention allows for infusion of preforms 12 of greater complexity and with more layers 12a and therefore greater thicknesses than was previously possible, data with respect to the flow characteristics may be collected in three dimensional terms. The sensors 82 monitor such data, which is collected by the digital processor 92 at a sampling rate generally in the range of about one sample per ten seconds. As infusions of preforms 12 can typically take in the range of thirty to ninety minutes to be substantially completed, such a sampling rate facilitates a high level of real time or near real time control of infusion of a fiber containing preform 12. Based on the monitored flow characteristics, the sensors 82 generate representative condition signals. The sensing means 80 are in signal conveying relation to the control means 90. As a result of this signal conveying relation, the condition signals generated by the sensors 82 will be transmitted, typically in analog form, via the sensor lines 84, to the control means 90, where they are received and digitized. The generation and conveyance of the condition signals occur in such close chronological proximity as to be substantially contemporaneous.

Upon receipt of the condition signals by the control means 90, the digital processor 92 compares the condition signals to the reference signals which, again, are indicative of target ranges of flow characteristics at the particular time and for the particular preform 12 and, more specifically, for the particular location in the preform 12 being infused and monitored by the respective sensor 82. According to this comparison, the digital processor 92 generates control signals. These control signals are indicative of levels of the variable volumetric rate of resin 10 supply from the resin pump 50 and the level of vacuum draw on the mould chamber, to be implemented at appropriate inlet ports 44, 44', and vacuum ports 62, respectively. The levels indicated by the control signals are as determined, based on the comparison, to be necessary to cause subsequently monitored flow characteristics to more closely match the predetermined target values for same than was the case with earlier monitored flow characteristics and their predetermined counterparts. Subsequent to generation, the control signals are then converted to analog form and transmitted to the resin pump 50 and the variable vacuum means 70, via the resin control lines 94 and vacuum control lines 96, respectively. The control signals are then received by the resin pump 50 and variable vacuum means 70. The resin pump 50 is responsive to the control means 90, such that the speed and direction of the resin pump 50 and, as a result, the variable volumetric rate of supply of resin 10 may be varied in accordance with the received control signals. The vacuum pumps 72 and vacuum regulators 76 are responsive to the control means 90 such that the vacuum draw on the mould chamber 40 can also be varied, as described hereinabove, in accordance with the control signals. As the data from the sensors 82 will be indicative of flow characteristics at points throughout the mould chamber 40, control signals may be generated such that alterations are localized to correct errors in the infusion process at the specific locations in the preform 12 where they are sensed by the sensors 82. Control signals sent to each of the vacuum regulators 76 could be indicative of raising, lowering, or maintaining the vacuum draw at the vacuum port 62 to which the particular vacuum regulator 76 is connected. The control signals can be indicative of differing variations in vacuum draw at all the vacuum regulators 76. Control signals sent to the vacuum pumps 72 could be indicative of shutdown of each vacuum pump 72. The control signals sent to vacuum pumps 72 could also be indicative of maintenance of a particular vacuum draw level. Control signals sent to each resin pump 50 could be indicative of a raising or a lowering of the variable volumetric rate, and could, in some instances, be indicative of reversing the resin flow direction. Thus, resin 10 could be drawn out from the inlet ports 44. Variations in the variable volumetric rate can be different at each individual resin pump 50 in accordance with the action dictated at each particular resin pump 50 by the received control signal. The alterations of vacuum draw and the variable volumetric rate described above in response to received control signals occur as parts of a real time or near real time feedback loop controlled by the control means 90.

By way of example, the condition signals could be such that, when compared with the reference signals, the resin 10 is determined to be advancing too quickly in one area of the preform 12. A risk would therefore exist of incomplete wetting of the layers 12a of the preform 12 and an accompanying lack of strength and rigidity in any composite part or assembly resulting after subsequent curing. Control signals may be generated such that vacuum draw is lessened at specific vacuum ports 62 in the vicinity of the location where infusion is occurring too quickly. In such a scenario, the generated control signal may even cause an increase in the draw at some vacuum ports 62 in other regions of the preform 12 to be effected in order to further slow the flow of resin 10 to the affected area of the preform 12. In each instance of variation described in this example, the variation would be achieved by the respective vacuum regulators 76 at the ports where the variations occurred, in response to the control signals received by each vacuum regulator. In the described instance, the real time, or near real time feedback loop control offered by the system 30 of the present invention would allow for complete wetting of the layers 12a of the preform 12 to be achieved, thereby maintaining the strength and rigidity of the eventual composite structure. The preform 12 would thus not be spoiled and thereby rendered useless by incomplete wetting of the layers 12a of the preform 12, especially as it relates to aerospace applications which demand higher strengths and greater quality control as between one composite part or assembly and the next. This type of real time or near real time continuous corrective action on the fly was not possible in the prior art.

A method 200 according to the present invention will now be briefly described with reference to the Figures. It will be appreciated by one skilled in the art that the method 200 outlined hereinbelow is but one such method that falls within the scope of the invention as circumscribed by the appended claims. In the following description, the same reference numerals have been used to indicate various components, surfaces, materials, relations, directions, and configurations which are common to both the method 200 and the system 30 (described above) of the present invention. It should, however, be appreciated that, although some of the components, surfaces, materials, relations, directions, and configurations of the system 30 are not specifically referenced in the following description of the method 200, they may be used, and/or adapted for use, in association therewith.

Figure 5:
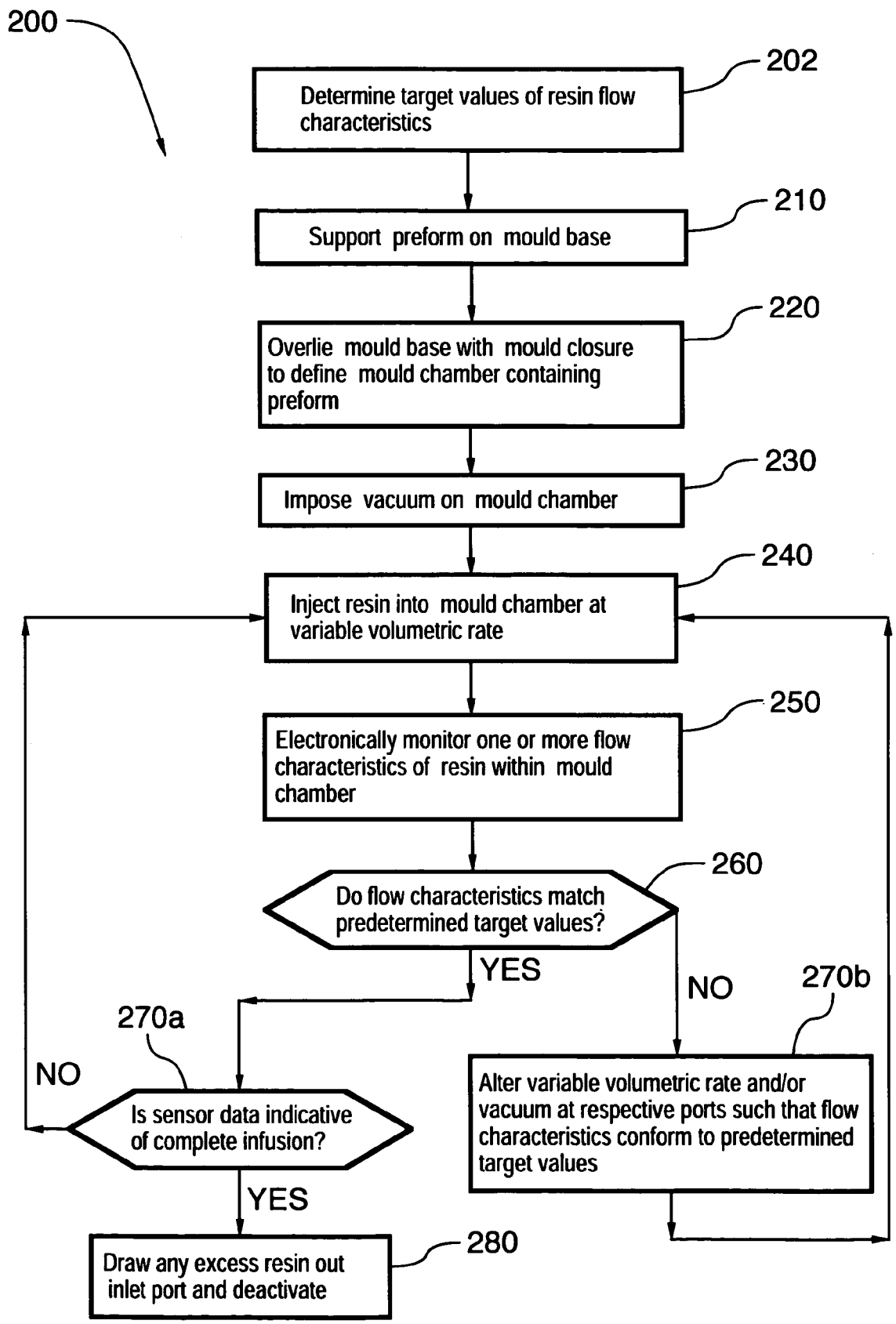
FIG. 5 is a flow diagram illustrating a method within the scope of the present invention.

Now, with specific reference to FIG. 5, a flow diagram illustrating a method 200 within the scope of the present invention is shown. According to the method 200 depicted in FIG. 5, target values of flow characteristics of the resin 10 for particular sensed locations at various time co-ordinates throughout the resin injection cycle are predetermined in step 202. These predeterminations may advantageously be made using computer simulation of the infusion process, as described hereinabove with reference to the system 30. Proceeding from step 202, in step 210, the preform 12 is supported on the mould base 32 (alternatively herein referred to as a mould base portion 32), upon completion of which the system 30 proceeds to step 220. In step 220, the mould base 32 is overlain with the mould closure 34 (alternatively herein referred to as a mould closure portion 34) to define the mould chamber 40 containing the preform 12 therein, as seen in FIG. 1.

Proceeding from step 220, in step 230, a vacuum is imposed on the mould chamber 40 by the variable vacuum means 70, as discussed hereinabove, with reference to the system 30. The method 200 then proceeds to step 240, wherein the resin 10 is injected into the mould chamber 40 at a variable volumetric rate, as this term is defined hereinabove. This injection of resin 10 into the mould chamber 40 is preferably effected by one or more resin pumps 50, as described hereinabove with reference to the system 30. The aforesaid vacuum pulls the resin 10 through the layers 12a of the preform 12, as described hereinabove with respect to the system 30. Proceeding from step 240, in step 250, flow characteristics of the resin 10 within the mould chamber 40 are electronically monitored by, for example, the sensors 82, as best seen in FIG. 4, and as described hereinabove with reference to the system 30. The method 200 then proceeds to step 260.

In step 260, a query is posed as to whether or not the monitored flow characteristics match the predetermined target values. This query is performed by the digital processor 92 comparing the monitored flow characteristics to their respective predetermined target values, as described hereinabove with respect to the system 30. If the monitored flow characteristics do not match the predetermined target values for a particular sensor 82 location within the mould chamber 40, for a particular time co-ordinate, in step 270b, the vacuum draw on the mould chamber 40 and/or the variable volumetric rate of injection of the resin 10 are altered, in manners as described hereinabove with respect to the system 30. These variations will be such that subsequently monitored flow characteristics will then conform more closely, if not completely, to their respective predetermined target values. The method 200 would then return to step 240. If, in step 260, the monitored flow characteristics do match the predetermined target values, the method 200 proceeds to step 270a, wherein a query is posed as to whether the monitored data is indicative of complete infusion of the preform 12. This query is again accomplished by a digital processor 92 comparison. If the monitored flow characteristics are the same as those indicative of complete infusion of the preform 12, the method 200 draws any excess resin 10 out the inlet port 44 and deactivates. If they are not, the method 200 returns to step 240.

Other modifications and alterations may be used in the design and manufacture of other embodiments according to the present invention without departing from the spirit and scope of the invention, which is limited only by the accompanying claims. For example, while the condition signals are described hereinabove as being transmitted from the sensors 82 to the control means 90 via sensor lines 84, one skilled in the art would recognize that these condition signals could be conveyed wirelessly. Similarly, the control signals described hereinabove as being transmitted from the control means 90 to the resin pump means 48 via the resin control lines 94, and to the variable vacuum means 70 via the vacuum control lines 96, could, in both cases, alternatively be conveyed wirelessly.

Numerous determinations including, among others, the locations and numbers of the inlet ports 44,44', the vacuum ports 62, the sensors 82, as well as the initial level of the variable volumetric rate are described hereinabove as being assisted by computer simulation using modeling software such as the aforementioned RTM-Worx™. One skilled in the art would recognize that each of these determinations could also be made by, for example, empirical testing. Such empirical testing could include, for example, iteratively infusing preforms 12 while each time using different locations and numbers of, for example, inlet ports 44, 44'. All other system 30 parameters would be maintained at constant levels, in order to determine an optimum level of the varied parameter, among those values attempted. Similar iterations could, of course, be performed with respect to, for example, number and location of vacuum ports 62 and sensor 82 as well as the initial value of the variable volumetric rate. As stated hereinabove, the use of computer simulation may be a more cost-effective and less laborious means of making the determinations discussed hereinabove.

The system 30 of the present invention is described hereinabove as including vacuum reservoirs 74. One skilled in the art will recognize that some embodiments of the present invention may not include vacuum reservoirs 74; however, in such embodiments the vacuum pumps 72 will need to run much more often in order to maintain the operative vacuum level. As such, it may be more advantageous to employ vacuum reservoirs 74.

The system 30 is shown as including only one control means 90 controlling the infusion of but one preform 12. One skilled in the art would readily recognize that some embodiments of the present invention could be adapted to perform simultaneous infusions of multiple preforms 12, controlled by one or more control means 90, still maintaining real time, or near real time control.

One skilled in the art will further recognize that in some embodiments of the present invention it may be advantageous to employ one or more electrical relays, which may be, but are not limited to, undervoltage, overvoltage and differential type relays. Such relays would be employed in order to maintain substantially constant voltage conditions with respect to the system 30, and thereby minimize interruptions of infusion processes, as well as to protect against electrical damage to the system 30, including, in particular, the digital processor 92.

One skilled in the art will additionally recognize that vacuum pumps 72, such as the aforementioned Rotary Vane High Vacuum Pump Model No. 4396K21, are not the only feasible way of drawing a vacuum on the mould chamber 40. A well-known alternative is a pressurized air tank driving a venturi to create a vacuum. Such a venturi may not have the potential to be varied as readily as is the case with the vacuum pumps 72. As such, the vacuum pumps 72 may be more advantageous for use in association with the present invention.

We claim:

1. A system for infusion of a fiber containing preform with a resin without the use of distribution media, said system consisting of:
   a) a mould base portion adapted to support said preform;
   b) a mould closure portion adapted to overlie said mould base portion in sealable relation to define a mould chamber containing said preform within;
   c) one or more resin supply port means in fluid communication with said mould chamber for guiding said resin into and out of said mould chamber during said infusion;
   d) one or more reversible resin pumps in fluid communication with said one or more resin supply port means and adapted for selectively pumping said resin in opposite flow directions through said one or more resin supply port means at a variable volumetric rate;
   e) a variable vacuum means adapted to create and vary a vacuum;
   f) one or more vacuum port means in fluid communication with said mould chamber and said variable vacuum means and adapted to impose said vacuum upon said mould chamber;
   g) one or more sensing means attached to one or more of said mould base portion and said mould closure portion for monitoring one or more flow characteristics of said resin within said mould chamber; and
   h) a control means responsive to said sensing means and operatively connected to said resin pumps and to said variable vacuum means for varying the flow of said resin within said mould chamber by varying one or more of said resin flow directions, said variable volumetric rate, and said vacuum to effect infusion of said perform.

2. A system according to claim 1, wherein said control means comprises a digital processor.

3. A system according to claim 2, wherein said flow characteristics include one or more of resin pressure, resin temperature, and resin position within the mould chamber.

4. A system according to claim 3, wherein said one or more sensing means are in condition signal conveying relation to said control means, such that said control means receives one or more condition signals from said sensing means, wherein said condition signals are indicative of said flow characteristics.

5. A system according to claim 4, wherein said digital processor is in control signal conveying relation with said resin pumps and said variable vacuum means, such that said resin pumps and said variable vacuum means receive one or more control signals from said digital processor, with said digital processor making a comparison between said condition signals and one or more reference signals representing target ranges of said flow characteristics and generating said control signals in accordance with said comparison.

6. A system according to claim 5, wherein said sensing means comprises one or more sensors for generating said condition signals based on measurement of said flow characteristics.

7. A system according to claim 6, wherein said sensors are selected from a group consisting of ultrasonic, resistance, capacitance, electrically and dielectrically based sensors.

8. A system according to claim 7, wherein said reference signals representing target ranges of said flow characteristics are generated through computer simulation of said infusion and input to said digital processor prior to commencement of said infusion for said comparison.

9. A system according to claim 8, wherein said reference signals representing target ranges of said flow characteristics are determined based on empirical testing and input to said digital processor prior to commencement of said infusion for said comparison.

10. A system according to claim 9, wherein said resin supply port means each comprises an inlet port and one or more resin supply lines connecting said inlet port to at least one of said one or more resin pumps.

11. A system according to claim 10, wherein said vacuum port means each comprises a vacuum port and at least one vacuum line connecting said vacuum port to said variable vacuum means.

12. A system according to claim 11, wherein said variable vacuum means comprises one or more vacuum pumps and one or more vacuum regulators operatively connected to each said vacuum line, wherein said vacuum pumps and said vacuum regulators are responsive to said control means for varying said vacuum in each said vacuum line in accordance with said control signals.

13. A system according to claim 12, wherein each said resin pump is a peristaltic pump.

14. A method of infusing a fiber containing preform with a resin without the use of distribution media, said method consisting of the steps of:
   a) predetermining one or more reference signals representative of target ranges of resin flow characteristics;
   b) supporting said preform on a mould base;
   c) overlying said mould base with a mould closure in sealable relation so as to define a mould chamber, with said preform contained within;
   d) imposing a vacuum upon said mould chamber by a variable vacuum means in fluid communication with one or more vacuum port means, wherein said vacuum port means is in fluid communication with said mould chamber;
   e) selectively pumping said resin in opposite flow directions into and out of said mould chamber at a variable volumetric rate through one or more resin supply ports in fluid communication with said mould chamber using one or more reversible resin pumps in fluid communication with said resin supply ports;
   f) electronically monitoring one or more flow characteristics of said resin within said mould chamber; and
   g) varying, in response to said monitored flow characteristics, and in real time or near real time, said variable volumetric rate by varying the speed and flow direction of one or more of said resin pumps.

15. A method according to claim 14, wherein said method further comprises varying, in response to said monitored flow characteristics, and in real time or near real time, said vacuum.

16. A method according to claim 14, wherein in step (f) said flow characteristics are monitored by one or more sensing means attached to one or more of said mould base and said mould closure.

17. A method according to claim 16, wherein said flow characteristics include one or more of resin pressure, resin temperature, flow direction, and resin position within the mould chamber.

18. A method according to claim 14, wherein said method further comprises the steps of:
   f.1) generating one or more condition signals indicative of said flow characteristics;
   g.1) receiving said condition signals from said sensing means;
   g.2) comparing said condition signals with said one or more predetermined reference signals;
   g.3) generating one or more control signals in accordance with said comparison;
   g.4) transmitting said control signals to one or more of said resin pumps and said variable vacuum means; and
   g.5) adjusting resin flow by adjusting said variable volumetric rate and flow direction.

19. A method according to claim 18, wherein said method further comprises the step of adjusting resin flow by adjusting the vacuum applied by said variable vacuum means on said vacuum port means.

20. A method according to claim 18, wherein said condition signals are received from said sensing means by a control means.

21. A method according to claim 20, wherein said control means comprises a digital processor.

22. A method according to claim 21, wherein said digital processor effects said comparison, generates said control signals and transmits said control signals.

23. A method according to claim 22, wherein said sensing means comprises one or more sensors for generating said control signals based on said flow characteristics.

24. A method according to claim 23, wherein said sensors are selected from a group comprising ultrasonic, resistance, capacitance, electrically and dielectrically based sensors.

25. A method according to claim 18, wherein said resin supply port means each comprises an inlet port and one or more resin supply lines connecting said inlet port to at least one of said one or more resin pumps.

26. A method according to claim 18, wherein each said resin pump is responsive to said control means for varying the speed and flow direction of said resin pump in accordance with said control signals.

27. A method according to claim 18, wherein said vacuum port means each comprises a vacuum port and one or more vacuum lines connecting said vacuum port to said variable vacuum means.

28. A method according to claim 27, wherein said variable vacuum means comprises one or more vacuum pumps and one or more vacuum regulators wherein said vacuum pumps and said vacuum regulators are responsive to said control means for varying said draw in accordance with said control signals.

29. A method according to claim 18, wherein said reference signals representing desired ranges of said flow characteristics are predetermined through computer simulation of said infusion and input to said digital processor prior to commencement of said infusion for said comparison.

30. A method according to claim 18, wherein said reference signals representing desired ranges of said flow characteristics are determined based on empirical testing and input to said digital processor prior to commencement of said infusion for said comparison.

31. A method according to claim 26, wherein each said resin pump is a peristaltic pump.

32. A method according to claim 14, wherein excess resin is drawn out said resin supply port means in the opposite flow direction of its entry through said resin supply port means.

* * * * *